(No Model.) 2 Sheets—Sheet 1.

A. G. WHEELER.
SUPPLY SYSTEM FOR ELECTRIC RAILWAYS.

No. 532,126. Patented Jan. 8, 1895.

Attest:
Raymond F. Barnes.

Inventor:
Albert G. Wheeler
By Dayton, Poole & Brown
his Attorneys (No Model.) 2 Sheets—Sheet 2.
A. G. WHEELER.
SUPPLY SYSTEM FOR ELECTRIC RAILWAYS.
No. 532,126. Patented Jan. 8, 1895.
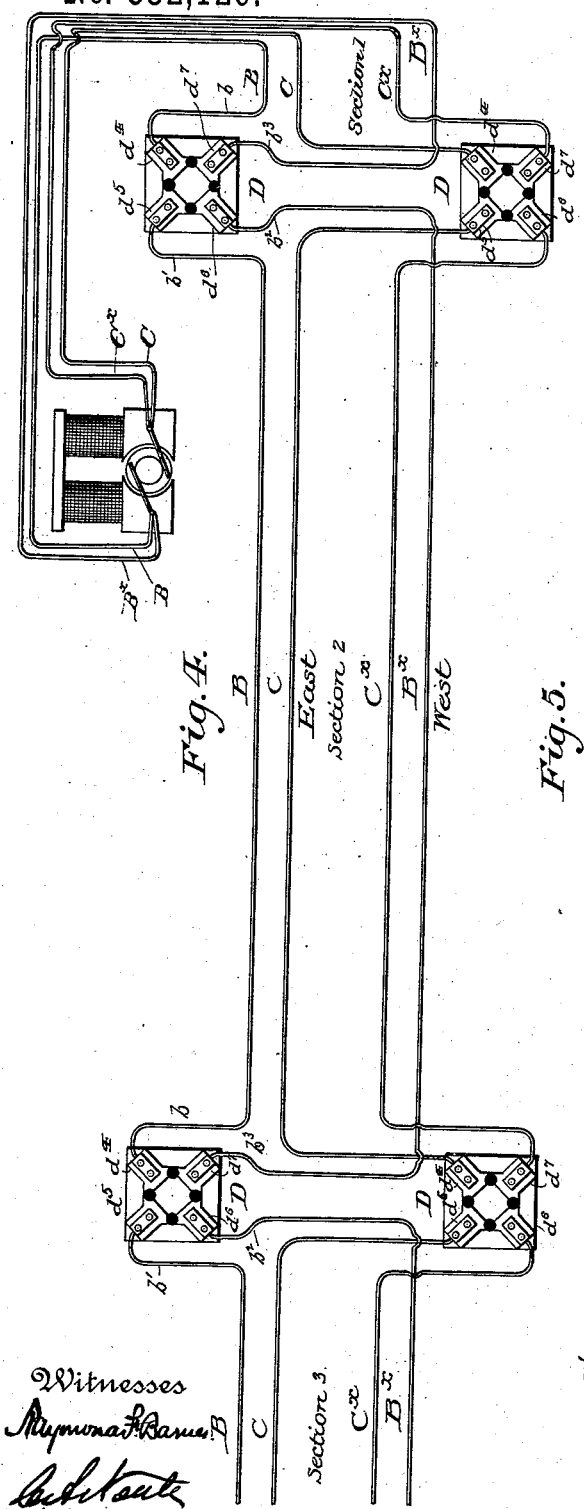
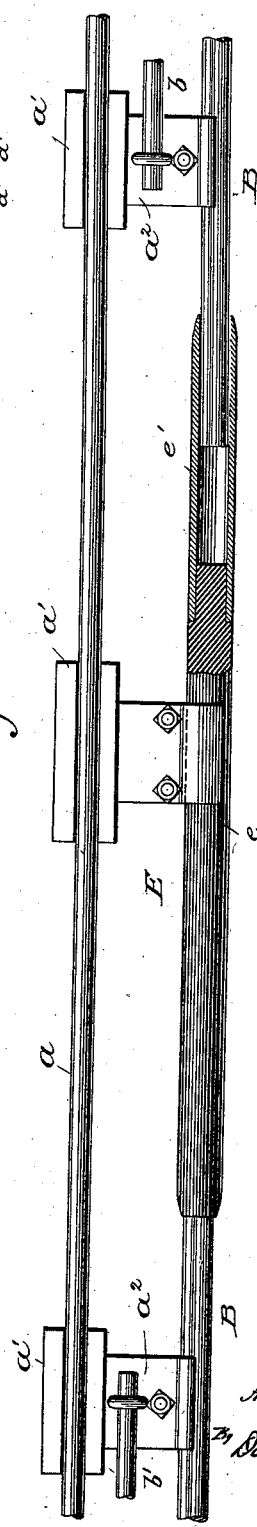
Witnesses
Inventor
Albert G. Wheeler
His Attorneys ated January 8, 1895.

UNITED STATES PATENT OFFICE.

ALBERT G. WHEELER, OF CHICAGO, ILLINOIS, ASSIGNOR TO THE LOVE ELECTRIC TRACTION COMPANY, OF SAME PLACE.

SUPPLY SYSTEM FOR ELECTRIC RAILWAYS.

SPECIFICATION forming part of Letters Patent No. 532,126, dated January 8, 1895.

Application filed January 21, 1893. Serial No. 459,238. (No model.)

*To all whom it may concern:*

Be it known that I, ALBERT G. WHEELER, of Chicago, in the county of Cook and State of Illinois, have invented certain new and useful Improvements in Supply Systems for Electric Railways; and I do hereby declare that the following is a full, clear, and exact description thereof, reference being had to the accompanying drawings, and to the letters and figures of reference marked thereon, which form a part of this specification.

This invention relates to that class of electric traction systems in which the actuating or motor current is supplied from a suitably located generator, to line wires or conductors arranged parallel with the tram rails upon which the electrically actuated vehicles are to run.

One object of my invention is to provide for cutting out or diverting the current from any portion of a conductor without interrupting the current from the generator to the line by stringing said conductor in independent sections, each connected at its ends with an auxiliary or substitute conductor by metallic connections embracing circuit breakers or switch devices; thus enabling repairs to be made at any point throughout the length of the line without risk of injury to workmen or others through handling, or coming in contact with a live wire, and also avoiding the necessity of cutting off the current at the power house to effect repairs, as in the use of a non-sectional conductor.

Another object of the invention is to provide for the maintenance, normally of an equilibrium of current upon the two main or supply conductors of two parallel or adjacent tracks by the establishment of cross connections between the said supply conductors.

Another object of the invention is to provide for increasing the current on one or more sections of a supply conductor without an increase of the current supplied from the generator.

With these and other objects in view the invention consists in the matters to be described in the ensuing specification, and claimed in the clauses at the close thereof.

Figure 1:
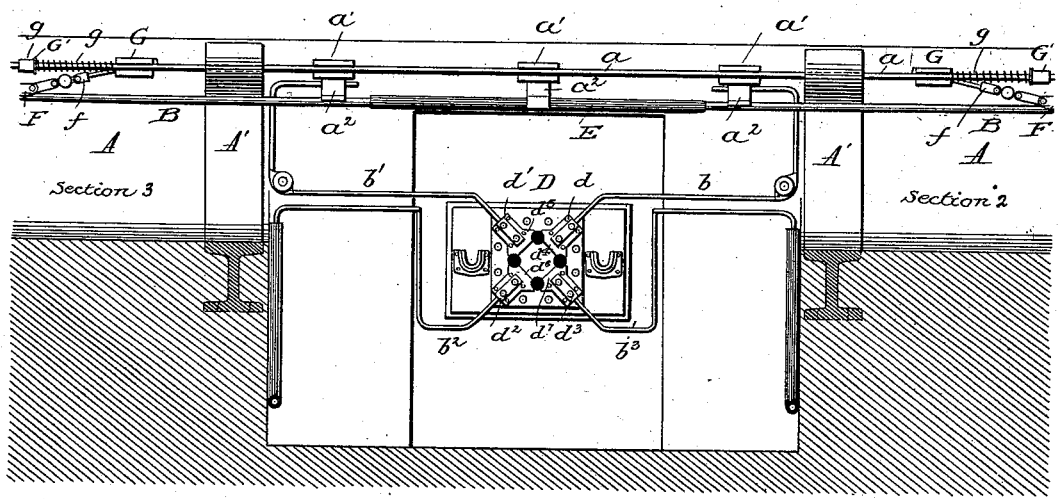
Figure 2:
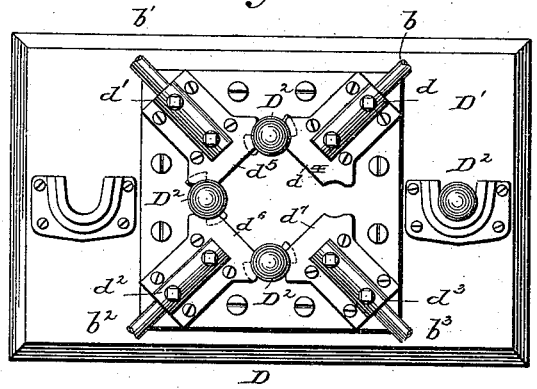
Figure 3:
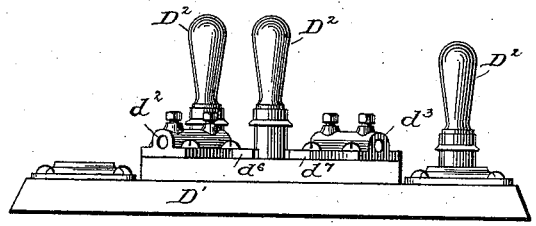

In the accompanying drawings—Figure 1— is a longitudinal sectional view taken vertically through an underground conduit, and illustrating one form of device embodying my improvements. Fig. 2— is a plan view, on a larger scale, of the switch board shown in Fig. 1. Fig. 3— is a side elevation of said switch board. Fig. 4— is a plan view showing diagrammatically an arrangement of conductors by which my invention may be carried into effect. Fig. 5— is an elevation, on a larger scale, showing the manner of supporting the section ends of a conductor, and the telescopic connection therefor.

My invention is applicable to both overhead and underground systems, and a part of it to either double or single track roads. It is here shown, however, as applied to meet the requirements of a double track road operated by underground conductors.

In a double track road, in connection with which I have chosen to illustrate my invention, the conductor of one track or conduit may be utilized as, or constitutes a substitute wire for the other track, and vice versa, and is so described and illustrated herein. With this understanding, reference will now be made to the drawings, wherein—

A conduit A is shown as located centrally between the tram rails of the respective tracks, in a manner well known, positive and negative conductors B and B$^\times$ and C and C$^\times$ being strung within each conduit A, one on each side of the slot thereof (not shown). It will be understood, however, in this connection, that my invention is applicable to systems in which a ground connection, or one of the track rails, is employed in lieu of the negative or return conductor C, C$^\times$.

The conduits A are in all respects similar, and may be of any usual or preferred construction, the yokes A′ thereof being provided with suitable means or devices, such as the horizontal rods $a$, passing through and secured to said yokes for supporting insulators $a'$, by the depending jaws or clips $a^2$ of which the conductors B and C are suspended.

The conductors B B$^\times$ and C C$^\times$ are arranged in sections 1, 2, 3, &c., of any suitable or desired length, say from five hundred to five thousand feet, more or less, the several sections of each conductor being electrically separated from each other by insulators, but mechanically connected by couplings forming, in connection with the conductors, a practically continuous or unbroken surface on which run the trolleys, collectors or other traveling contact devices. Each conductor-section is entirely independent of all the other sections of said conductor, though under normal conditions all of said sections are coupled together by suitable metallic connections embracing circuit breakers or switch contact devices D and constitute, in effect, continuous conductors extending from one to the other end of the line or road so that the trolleys or collectors carried by a car, transmit to the motor thereof a continuous unbroken current, or practically so, notwithstanding the sectional arrangement of said conductors.

Each end of each section 1, 2, 3, &c., of the respective conductors B $B^\times$ and C $C^\times$ is connected by any suitable metallic connections embracing circuit breakers or switch or contact devices, here designated as a whole by the letter D, with the adjacent sections of the conductor of the other conduit; the arrangement being such that the current may, on any particular section, say 2, traverse the conductor, B or C, or the conductor $B^\times$ or $C^\times$ of the other conduit or both the conductors B $B^\times$ or C $C^\times$ as desired.

In the double track arrangement shown, referring particularly to Fig. 4, wherein the conductors for the respective tracks are diagrammatically arranged and marked "east" and "west," the conductors of one track, constitute the substitute wires for the conductors of the other track, the "east" conductor B of section 2, being the substitute wire for "west" conductor $B^\times$ of sections 1 and 3, and so on through its entire length of the line, each section of the east conductor B serving as a feeder or substitute conductor for the two next adjacent sections of the west conductor $B^\times$, and vice versa. The return conductors C and $C^\times$ are in all respects similarly arranged. Thus arranged it follows, under the normal conditions described, that the current on the supply and return conductors of the conduits A is self regulating to maintain an equilibrium of supply, and that an expenditure of power by one conductor, say the east, will be automatically compensated for, by a supply of current from the other or west conductor.

The connections between the adjacent ends of adjacent sections of the conductors, and the ends of said sections with the substitute wire, (here represented as the corresponding sections of a correspondingly arranged conductor) are such that they may be severed or adjusted at will to cut out any one section of the conductor, without interrupting the current on the conductor as a whole; that is to say, one section, say 2, of the east conductor B may be cut out of circuit, the current then passing from section 1 to section 3 by way of section 2 of west conductor $B^\times$ (the substitute wire) and the section 2 of conductor B becoming a dead wire which may be handled and repaired without danger, while the road is in full operation.

As well adapted for electrically connecting the adjacent ends of the several sections I have illustrated a switch board D comprising a base D', and binding posts or sleeves $d$ $d'$ $d^2$ and $d^3$ carrying contact blocks $d^4$ $d^5$ $d^6$ and $d^7$. The binding posts are suitably insulated from the base, and from each other, and are each adapted to receive and hold one end of a connecting wire, as shown. The contact blocks $d^4$ $d^5$ $d^6$ and $d^7$ are relatively so arranged that each may be connected with the two next adjacent blocks by suitable plugs $D^2$, this arrangement admitting of establishing connection at will between each contact block and all the others.

The end of conductor B of one section, say 2, is connected with binding post $d$ of the switch board D by a connecting wire $b$, a similar wire $b'$ serving to connect the adjacent end of said east conductor B of the next section 3 with the binding post $d'$. The binding posts $d^2$ and $d^3$ are similarly connected with the adjacent ends of the sections 2 and 3 of west conductor $B^\times$, the wire $b^2$ leading from post $d^2$ to section 2, of said conductor, and the wire $b^3$ from the post $d^3$ to the section 3 of said conductor. As thus arranged it will be apparent that with the four plugs $D^2$ in position to establish contact between the several contact blocks $d^4$, $d^5$, $d^6$ and $d^7$, as shown in Figs. 1 and 2, the current from section 1 of the east conductor B may pass freely through the switch board, by way of connecting wires $b$ and $b'$ to the next adjacent section 2 of said east conductor, and also, by way of connecting wires $b$ and $b^3$ to section 2 of the west conductor $B^\times$. Section 1 of west conductor $B^\times$ is also connected through wires $b^4$ and $b^3$ with its next section 2, and with section 2 of east conductor B by wires $b^4$ and $b^2$.

The currents on the respective east and west conductors are thus self regulating to maintain an equilibrium of supply to the motors fed from said wires as will be made more clear by the following: Supposing the current normally supplied by the generator to be capable of moving twenty cars, ten on each track, and that from temporary interruption of traffic fifteen cars are assembled on the east track while there are but five on the west, in such case the surplus of current on the west track would flow to the east conductor B to supply the necessary power or in other words the motors on the east track will take three fourths of the total quantity of current supplied to both tracks and those on the west track one fourth of the same. The arrangement shown also admits of diverting the whole current from the generator to one conductor, or to one or more short sections of said conductor, as will be hereinafter explained.

To cut out any one or more sections of the respective conductors the appropriate plugs D² of the switch board D are withdrawn to break connection between the contact blocks thereon. For instance to cut out section 2 of east conductor B, the plugs D² of switch board D at the junction of sections 2 and 3, will be removed from between the contact blocks $d^4$ and $d^5$ and $d^4$ and $d^7$, thus breaking connection with the wire $b$ at this end of section 2, the plugs of the switch board D at the other end of said section being removed from between the contact blocks $d^4$ and $d^5$, and $d^5$ and $d^6$. The current would then pass from section 1 of conductor B to section 2 of conductor B× (the substitute) by way of connecting wires $b$ and $b^2$, and contact blocks $d$, $d^3$ and $d^2$. The surplus of current thus carried by section 2 of conductor B× will pass back to conductor B at section 3 thereof by way of connecting wires $b^3$ and $b'$, and contact blocks $d^3$, $d^2$ and $d'$.

From the foregoing it will be apparent that not only may one or more sections of either conductor B or B× be cut out of circuit, but that the entire current on both conductors may be caused to pass through one or more sections of one of said conductors. This is of advantage in cases where, through some cause, a number of cars become assembled or blocked within a short space upon one track, and the current normally carried by the conductor of that track would be insufficient to supply power for moving said cars to raise the block expeditiously when the obstruction occasioning it is removed.

As before stated the adjacent ends of the respective sections of each conductor are mechanically connected to provide an uninterrupted way or track for the traveling trolleys or collectors but separated electrically in order that each section may be cut out of circuit independently of all the others.

The means herein illustrated for attaining this end consists of an insulated coupling E, embodying in its construction a length or rod $e$ of insulating material provided at each end with a socket $e'$ to receive the ends of adjacent conductor sections. The insulating length or rod $e$ may be formed of a bar of metal suitably incased in an insulating coating or jacket said rod or bar $e$ being conveniently suspended from the supporting rods $a$ of the conduit by insulators $a'$, in alignment with the conductor. The outer ends of the sockets $e'$ are beveled to avoid a shoulder at the junction of said sockets with the conductors.

In the sectional arrangement of the conductors hereinbefore described it is desirable that the ends of the respective sections be given some freedom of movement longitudinally to compensate for any expansion or contraction. For this purpose the sockets $e'$ are made of sufficient length, and tubular in form, to permit the ends of the conductor sections to move longitudinally therein without danger of disengagement. Said tubular sockets $e'$ are sleeved upon, and permanently secured to, the insulated rod $e$ in any approved manner.

With such a sectional arrangement of conductors as herein referred to they are desirably maintained under tension to avoid disconnection with the insulating couplings E, and to prevent sagging between their points of support. One form of tension device by which this end may be attained is illustrated in Fig. 1, said device consisting of a clip F secured rigidly to the conductor near its end, and connected by a connecting rod $f$ to a block G mounted to slide longitudinally upon the supporting rods $a$. An abutment G' is secured rigidly to said supporting rods $a$ and compression springs $g$ are confined between said abutment G' and the sliding block G. The abutment G' may be adjustable upon the rods $a$, or the connecting rod $f$ may be made adjustable to bring the springs $g$ to the required tension. By this form of tension device not only is the conductor maintained under tension but owing to the interposition of the springs $g$ between the sliding block G and abutment G', expansion or contraction of the conductor is compensated for so that the tension on said conductor is uniform. This tension device, however, forms no part of the present invention, and I make no claims thereon.

What I claim is—

1. In an electric traction system, a generator, a working conductor or trolley wire connected with one pole of the generator and consisting of a plurality of separately insulated sections all of which are constantly in circuit with the generator, an auxiliary or feed conductor also connected with the same pole of the generator and constantly in circuit therewith independently of the working conductor, and metallic connections embracing contact breakers or switch devices, between the auxiliary conductor and each end of each section of the working conductor, and separate contact breakers or switch devices between adjacent ends of the insulated sections of said working conductor, substantially as described.

2. In an electric traction system, a generator, a working conductor or trolley wire, which consists of a plurality of separately insulated sections, all of which are constantly in circuit with the generator, metallic connections embracing circuit breakers between adjacent ends of said insulated sections, an auxiliary conductor, which also consists of a plurality of separately insulated sections, all of which are constantly in circuit with the generator, and metallic connections embracing circuit breakers making cross connections between alternate insulated sections of each conductor and the intervening sections of the other conductor, substantially as described.

3. In an electric traction system, a generator, a working conductor or trolley wire, which consists of a plurality of separately insulated sections, all of which are constantly in circuit with the generator, metallic connections embracing circuit breakers between adjacent ends of said insulated sections, an auxiliary conductor, which also consists of a plurality of separately insulated sections all of which are constantly in circuit with the generator, metallic connections embracing circuit breakers making cross connections between alternate insulated sections of each conductor and the intervening sections of the other conductor, and other metallic connections embracing circuit breakers between each end of each insulated section of each conductor and the corresponding end of the opposite insulated section of the other conductor, substantially as described.

4. The combination, in a two-track railway, of two sectional supply conductors, one for each track, the ends of the sections of one conductor being connected with the ends of adjacent sections of the other conductor to maintain an equilibrium of the supply current to the motors connected with said two sectional conductors, substantially as described.

5. A sectional conductor in combination with an insulating coupling for uniting the ends of adjacent sections, comprising a rod or bar of insulating material and tubes connected with the same and having sliding or telescopic engagement with the adjacent ends of the conductor sections, substantially as described.

6. The combination with a sectional conductor of an auxiliary or substitute conductor, connections embracing switch devices between each end of each section of the sectional conductor and the substitute conductor, other connections embracing switch devices between adjacent sections of said sectional conductor, and insulating couplings mechanically uniting the said adjacent ends of said sections, substantially as described.

7. The combination with a sectional conductor of an auxiliary or substitute conductor, and connections including a switch device between the meeting ends of adjacent sections of the sectional conductor, insulating couplings mechanically uniting said meeting ends of said sections, and other connections including switch devices between each end of each of said sections and the other conductor, substantially as described.

In testimony that I claim the foregoing as my invention I affix my signature in presence of two witnesses.

ALBERT G. WHEELER.

Witnesses:
C. A. NEALE,
CHAS. O. O'NEILL.